US008065178B2

(12) United States Patent
Lloyd et al.

(10) Patent No.: US 8,065,178 B2
(45) Date of Patent: Nov. 22, 2011

(54) METHOD AND SYSTEM FOR AUTOMATICALLY GENERATING FORECASTS

(75) Inventors: Stratton C. Lloyd, Seattle, WA (US); Alexander Goldstein, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1165 days.

(21) Appl. No.: 10/731,418

(22) Filed: Dec. 9, 2003

(65) Prior Publication Data
US 2007/0198320 A1 Aug. 23, 2007

(51) Int. Cl.
G06Q 10/00 (2006.01)
(52) U.S. Cl. .................. 705/7.29; 705/7.31
(58) Field of Classification Search ............ 705/7, 10, 705/7.29, 7.31
See application file for complete search history.

(56) References Cited

U.S. PATENT DOCUMENTS

| 6,067,525 | A | 5/2000 | Johnson et al. ............. 705/10 |
|---|---|---|---|
| 6,073,107 | A | 6/2000 | Minkiewicz et al. ........... 705/7 |
| 6,078,893 | A | 6/2000 | Ouimet et al. ............... 705/10 |
| 6,636,852 | B2 | 10/2003 | Gozdeck et al. .............. 707/9 |
| 6,804,657 | B1 * | 10/2004 | Sultan ...................... 705/10 |
| 6,920,464 | B2 | 7/2005 | Fox ...................... 707/104.1 |
| 6,995,768 | B2 | 2/2006 | Jou et al. ................. 345/440 |
| 7,216,087 | B2 * | 5/2007 | Thompson et al. .......... 705/10 |
| 7,324,983 | B1 * | 1/2008 | Morris et al. ............... 706/48 |
| 7,340,410 | B1 * | 3/2008 | Vaillancourt et al. ......... 705/10 |
| 7,516,084 | B1 | 4/2009 | Sankaran et al. ............ 705/10 |
| 7,516,106 | B2 | 4/2009 | Ehlers et al. ............... 704/412 |
| 7,644,009 | B2 | 1/2010 | Amerasinghe et al. ........ 705/10 |
| 2002/0049687 | A1 | 4/2002 | Helsper et al. .............. 706/45 |
| 2002/0099692 | A1 | 7/2002 | Shah et al. ................. 707/2 |
| 2002/0107720 | A1 | 8/2002 | Ernest ..................... 705/10 |
| 2002/0133444 | A1 | 9/2002 | Sankaran et al. ............ 705/36 |
| 2003/0074211 | A1 | 4/2003 | Lun ....................... 705/1 |
| 2003/0167380 | A1 | 9/2003 | Green et al. ............... 711/136 |
| 2007/0198320 | A1 | 8/2007 | Lloyd et al. ............... 705/10 |
| 2007/0203785 | A1 * | 8/2007 | Thompson et al. .......... 705/10 |
| 2007/0208607 | A1 * | 9/2007 | Amerasinghe et al. ........ 705/10 |
| 2007/0208608 | A1 * | 9/2007 | Amerasinghe et al. ........ 705/10 |
| 2007/0208639 | A1 | 9/2007 | Lloyd et al. ............... 705/1 |
| 2007/0265904 | A1 | 11/2007 | Lindquist et al. ............ 705/10 |

FOREIGN PATENT DOCUMENTS
WO WO 00/67191 11/2000

OTHER PUBLICATIONS

Business Wire; "S3/Diamond Multimedia Selects Channel Wave to Improve Sales Through Information Management," Apr. 5, 2000; 2 pages.

* cited by examiner

Primary Examiner — Johnna Loftis
(74) Attorney, Agent, or Firm — Campbell Stephenson LLP

(57) ABSTRACT

A method and system for defining and generating forecasts. The forecast system receives a forecast definition from a user, generates a forecast in accordance with the forecast definition, stores a forecast snapshot of the generated forecast, and presents to users forecast information derived from the forecast snapshots. A forecast definition specifies the participants to be included in a forecast and when to generate the forecast. At the scheduled time, the forecast system automatically generates the forecast and stores the forecast snapshot.

24 Claims, 11 Drawing Sheets

FIG. 5

| Status | Forecast Date ▲ | Pipeline | Forecast | Closed Revenue | Owner |
|---|---|---|---|---|---|
| Active | 9/21/2003 | $55,050,000.00 | $43,950,000.00 | $7,800,000.00 | Ethan Phillips |
| Active | 9/21/2003 | $55,050,000.00 | $43,950,000.00 | $7,800,000.00 | Joan Williams |
| Active | 9/21/2003 | $35,450,000.00 | $27,550,000.00 | $1,400,000.00 | Ryan Taylor |
| Active | 9/21/2003 | $10,400,000.00 | $7,200,000.00 | $3,200,000.00 | Rick Rogers |
| Active | 9/21/2003 | $0.00 | $0.00 | $0.00 | Lisa Waller |
| Active | 10/12/2003 | $12,600,000.00 | $10,850,000.00 | $0.00 | Ethan Phillips |
| Active | 10/12/2003 | $12,600,000.00 | $10,850,000.00 | $0.00 | Joan Williams |
| Active | 10/12/2003 | $2,800,000.00 | $2,800,000.00 | $0.00 | Ryan Taylor |
| Active | 10/12/2003 | $5,250,000.00 | $4,200,000.00 | $0.00 | Rick Rogers |
| Active | 10/12/2003 | $0.00 | $0.00 | $0.00 | Lisa Waller |
| Active | 10/19/2003 | $12,600,000.00 | $10,850,000.00 | $0.00 | Ethan Phillips |
| Active | 10/19/2003 | $12,600,000.00 | $10,850,000.00 | $0.00 | Joan Williams |
| Active | 10/19/2003 | $2,800,000.00 | $2,800,000.00 | $0.00 | Ryan Taylor |
| Active | 10/19/2003 | $5,250,000.00 | $4,200,000.00 | $0.00 | Rick Rogers |
| Active | 10/19/2003 | $0.00 | $0.00 | $0.00 | Lisa Waller |
| Active | 10/26/2003 | $12,600,000.00 | $10,850,000.00 | $0.00 | Ethan Phillips |
| Active | 10/26/2003 | $12,600,000.00 | $10,850,000.00 | $0.00 | Joan Williams |
| Active | 10/26/2003 | $2,800,000.00 | $2,800,000.00 | $0.00 | Ryan Taylor |
| Active | 10/26/2003 | $5,250,000.00 | $4,200,000.00 | $0.00 | Rick Rogers |
| Active | 10/26/2003 | $0.00 | $0.00 | $0.00 | Lisa Waller |
| Active | 11/2/2003 | $13,150,000.00 | $11,400,000.00 | $0.00 | Ethan Phillips |
| Active | 11/2/2003 | $13,150,000.00 | $11,400,000.00 | $0.00 | Joan Williams |
| Active | 11/2/2003 | $3,000,000.00 | $3,000,000.00 | $0.00 | Ryan Taylor |
| Active | 11/2/2003 | $5,600,000.00 | $4,550,000.00 | $0.00 | Rick Rogers |
| Active | 11/2/2003 | $0.00 | $0.00 | $0.00 | Lisa Waller |

FIG. 6

| Forecast Edit | Help | Save | Cancel | Refresh Totals | Back | | | |
|---|---|---|---|---|---|---|---|---|
| Forecast Summary | | | | | | | | |
| Forecast Date | Closed Revenue | | Forecast | | Best Case | | Pipeline | Expected Revenue |
| 7/1/2003 | $3,450,000.00 | | $25,200,000.00 | | $0.00 | | $33,100,000.00 | $11,975,017.30 |
| 8/1/2003 | $2,350,000.00 | | $5,950,000.00 | | $0.00 | | $5,950,000.00 | $4,869,997.65 |
| 9/1/2003 | $2,000,000.00 | | $12,800,000.00 | | $0.00 | | $16,000,000.00 | $9,470,000.00 |
| Totals | $7,800,000.00 | | $43,950,000.00 | | $0.00 | | $55,050,000.00 | $26,315,014.95 |

FIG. 7

METHOD AND SYSTEM FOR AUTOMATICALLY GENERATING FORECASTS

TECHNICAL FIELD

The described technology relates generally to generating sales forecasts and particularly to automatically archiving forecasts and presenting the archived forecasts.

BACKGROUND

Many organizations need to track the business opportunities of their sales forces. By tracking various business opportunities, an organization can forecast business statistics such as revenue and product quantities based on those opportunities. In addition, organizations generally would like to monitor how their actual revenue relates to their forecasted revenue based on actual-to-forecasted business statistics. By monitoring actual revenue, an organization can determine whether it is on track to meet its forecasted revenue. If it is not on track, then the organization can take appropriate actions.

Traditionally, each salesperson in an organization would track their own opportunities and, when requested, would provide their forecasts to their sales manager. Upon receiving these forecasts, a sales manager might create a spreadsheet that totals the forecasts of all the sales people reporting to that sales manager. That sales manager would then provide a summary of the forecast to a regional or divisional sales manager. Unfortunately, because only summary forecast information is provided to the next management level within a sales force, a certain manager may not have access to the historical details used to generate such forecasts. As a result, a manager may not be able to easily identify revenue or forecasting problems.

Some enterprise-based solutions have been developed that allow organizations to track their forecasts and the supporting details. These enterprise-based solutions assume a highly experienced administrator will set up and manage the forecasts for each organization. For example, some enterprise-based solutions allow an administrator to define the SQL queries that specify how forecasts are to be generated. However, it takes a high degree of sophistication to correctly define SQL queries. In addition, these enterprise-based solutions typically display forecast information on a record-by-record basis that may not provide an effective overview of the forecast information. Also, these enterprise-based solutions require that an administrator manually initiate each forecast, which can present problems if the administrator is unavailable or forgets to initiate a forecast at the appropriate time.

It would be desirable to have a forecast system that can be used by less experienced users and would provide forecast information in a way that can be used more effectively by less experienced users.

BRIEF DESCRIPTION OF THE DRAWINGS

FIG. 5 is a display page illustrating the individual forecasts of participants that were saved as part of forecast snapshots in one embodiment.

FIG. 6 is a display page illustrating a presentation of forecast information in one embodiment.

FIG. 7 is a display page illustrating the editing of forecast summary information in one embodiment.

DETAILED DESCRIPTION

Figure 1:
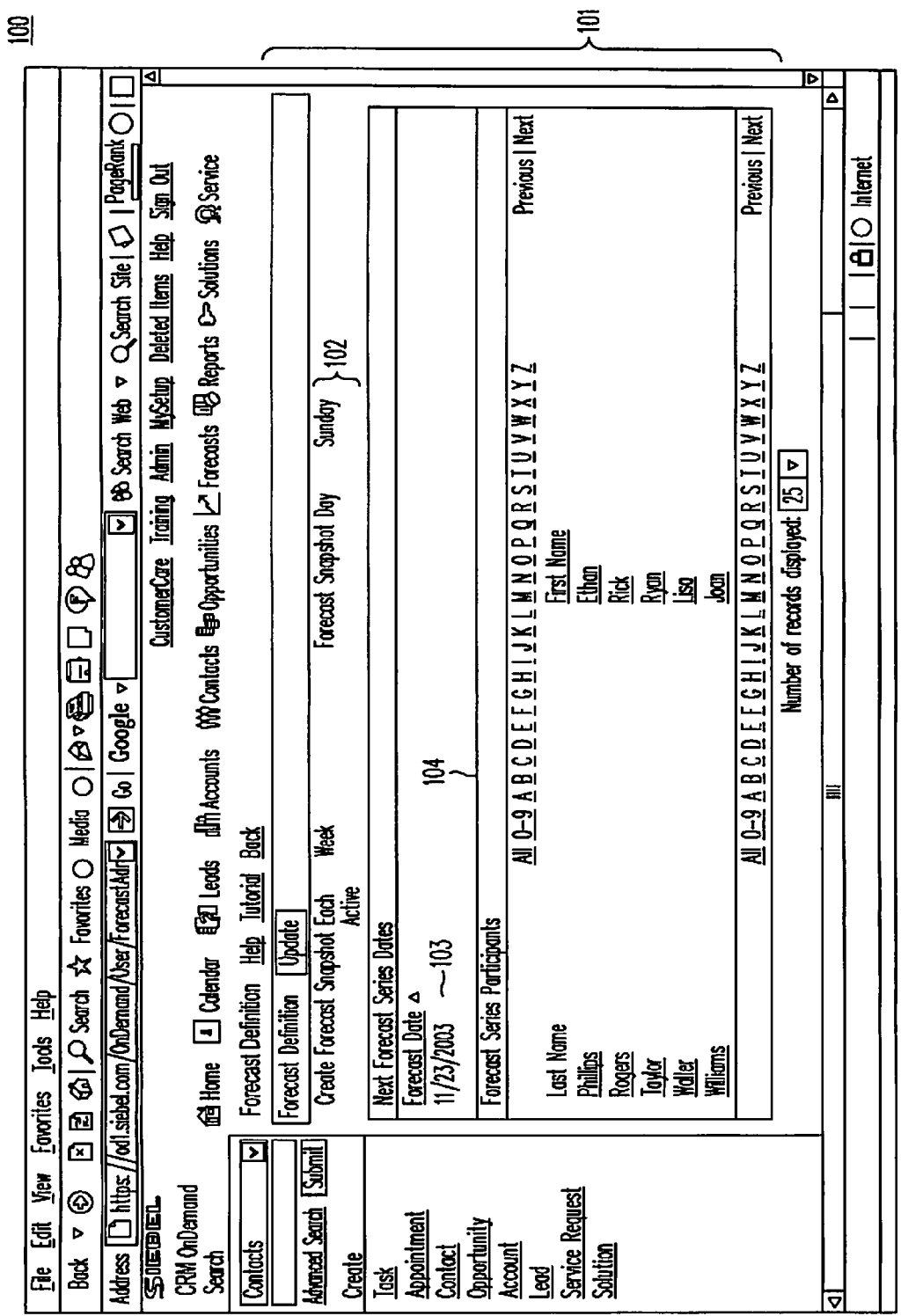
FIG. 1 is a display page illustrating a previously specified forecast definition in one embodiment.

A method and system for defining and generating forecasts is provided. In one embodiment, the forecast system receives a forecast definition from a user, generates a forecast in accordance with the forecast definition, stores a forecast snapshot of the generated forecast, and presents to users forecast information derived from the forecast snapshots. A forecast definition specifies the participants to be included in a forecast and when to generate the forecast. When defining a forecast, the forecast system receives from a user a scheduled time that includes a forecast interval, a day within the forecast interval for creating forecasts, and the roles of the participants to be included in the forecasts. At the scheduled time, the forecast system automatically generates a forecast and stores a forecast snapshot. The forecast snapshot includes forecast information for each participant along with the underlying opportunity information used to generate the forecast. The forecast information of a forecast snapshot includes summary forecasts for each manager within the hierarchy of the participants and individual forecasts for each participant. (A manager is a participant who has one or more reporting participants.) The forecast system thus allows forecast definitions to be specified by users who do not have extensive training and experience with forecasting systems, and it allows forecasts to be automatically generated. The forecast system may also automatically notify each participant (e.g., via electronic mail or other alert mechanism) that a forecast will be generated or has been generated so they can update their opportunity or forecast information.

In one embodiment, the forecast system presents forecast information in a way that allows a requesting user to easily view summary information, individual information for each participant, and the opportunity information of the requesting user. In this embodiment, the forecast system receives a request from a user to display forecast information for a forecast period (e.g., the current quarter). The forecast system then retrieves summary forecasts for the requesting user and individual forecasts for the participants that were previously saved in the forecast snapshots for that period. The forecast system then retrieves the current opportunities of the requesting user. The forecast system generates a display description (e.g., a web page) with a summary area, a participants area, and a user area. The summary area includes summary information for the forecasts of the requesting user. For example, the summary area may include a total revenue amount for all participants who report to the requesting user. The participants area includes information relating to the retrieved individual forecasts of each participant. The summary and participants areas may include a breakdown of the information based on the date of the forecast snapshots. The user area includes information relating to the current opportunities of the requesting user. The display description is then provided for display to the requesting user. The requesting user can then request to view the supporting information. For example, when the requesting user selects an individual forecast of the participants area, the forecast system may retrieve from the forecast snapshot the opportunity information used to generate the individual forecast and display it to the requesting user. The forecast system may allow the requesting user to drill down through the forecast information to the underlying opportunity information. The forecast system may allow the requesting user to edit their forecast information and may maintain an audit trail of the edits.

FIG. 1 is a display page illustrating a previously specified forecast definition in one embodiment. The display page 100 includes a forecast definition area 101. The forecast definition area includes a forecast interval area 102, a next forecast date area 103, and a forecast participants area 104. The forecast interval area indicates the frequency at which forecasts are to be generated and saved as forecast snapshots. In this example, a forecast is generated on a weekly basis every Sunday. The next forecast date area indicates the date at which the next forecast is to be generated. In this example, the next forecast is to be generated on Sunday, Nov. 23, 2003. The forecast participants area includes the names of each participant that is to be included in the forecast.

Figure 2:
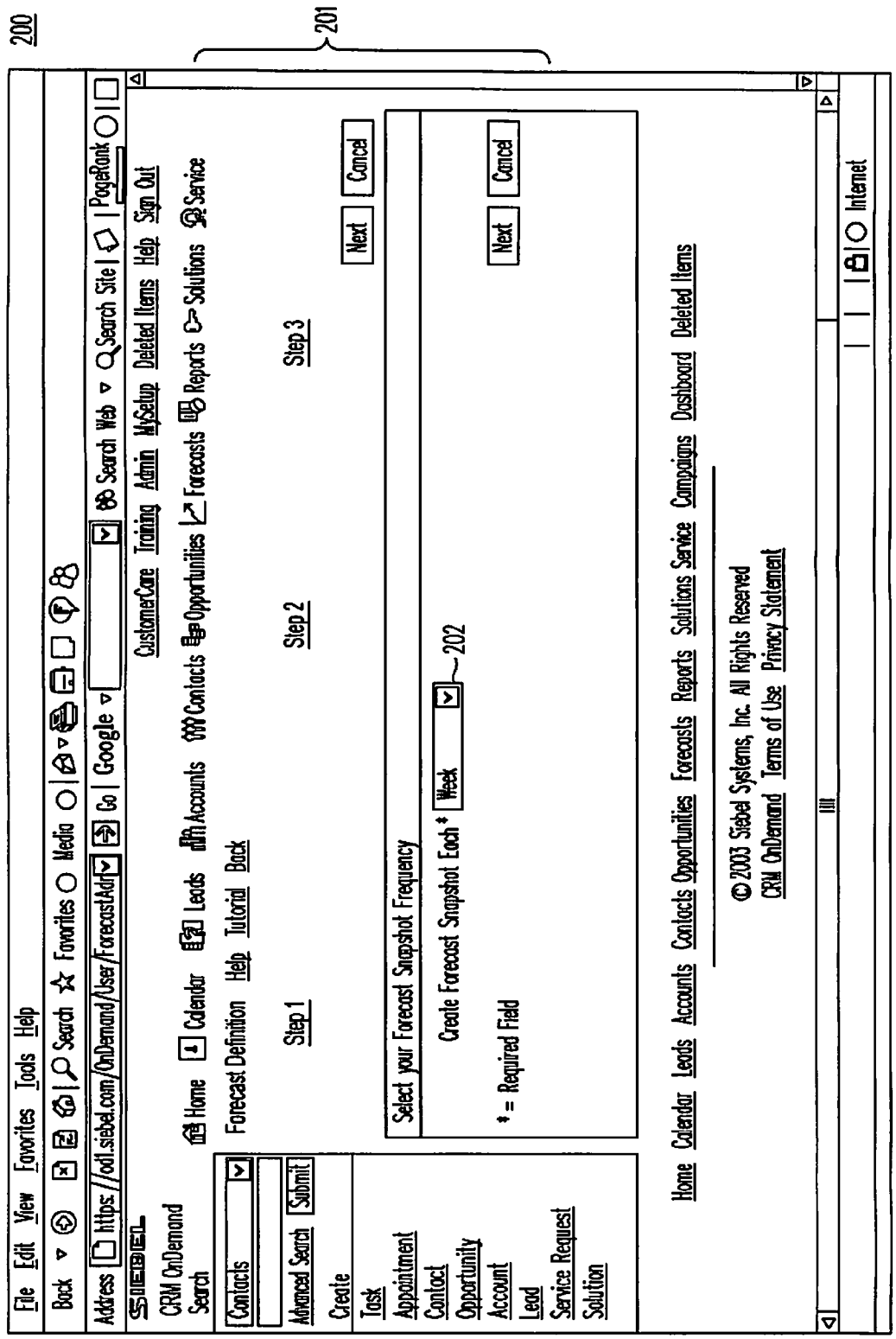
FIG. 2 is a display page illustrating the specifying of a forecast interval in one embodiment.
Figure 3:
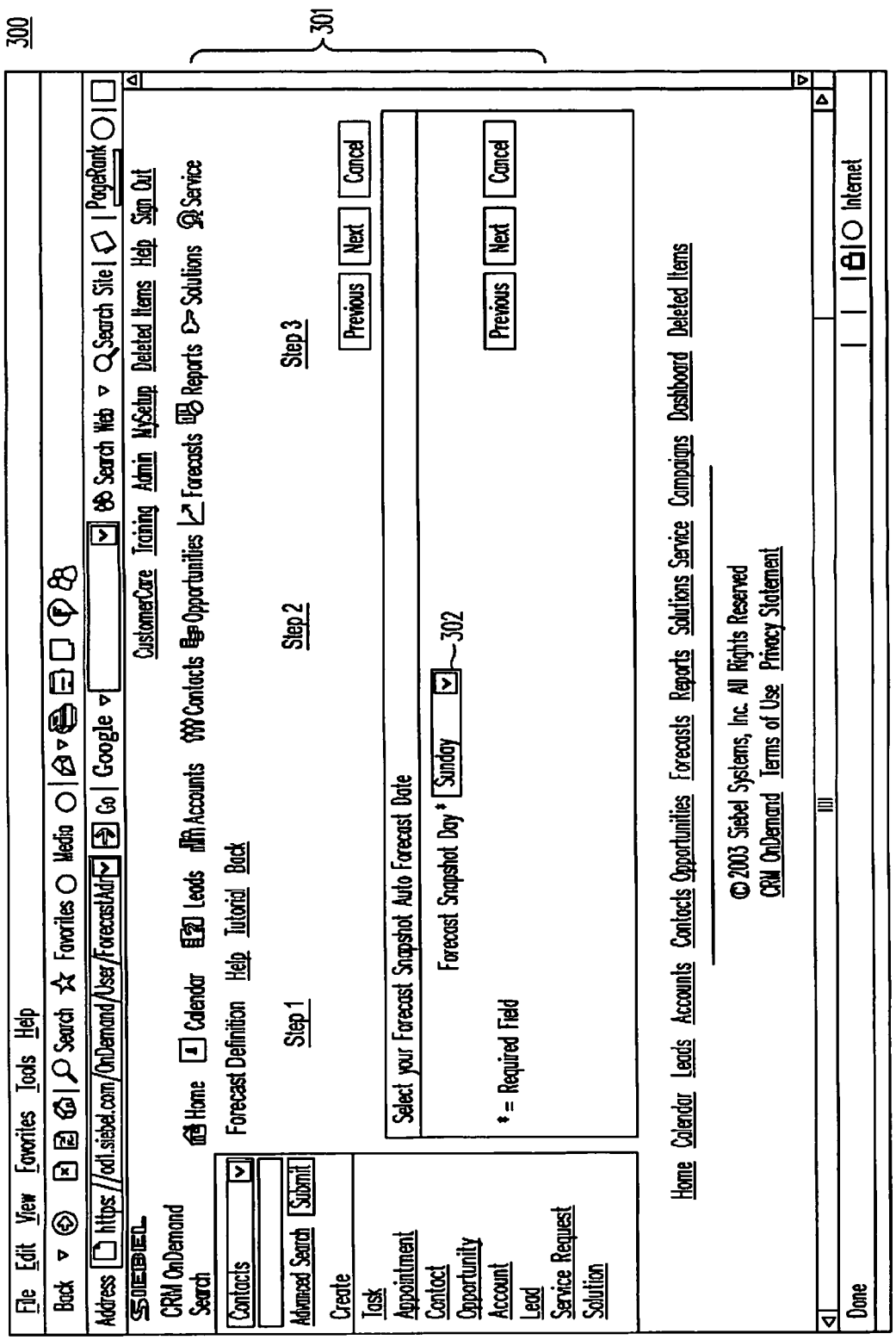
FIG. 3 is a display page illustrating the specifying of a forecast day in one embodiment.
Figure 4:
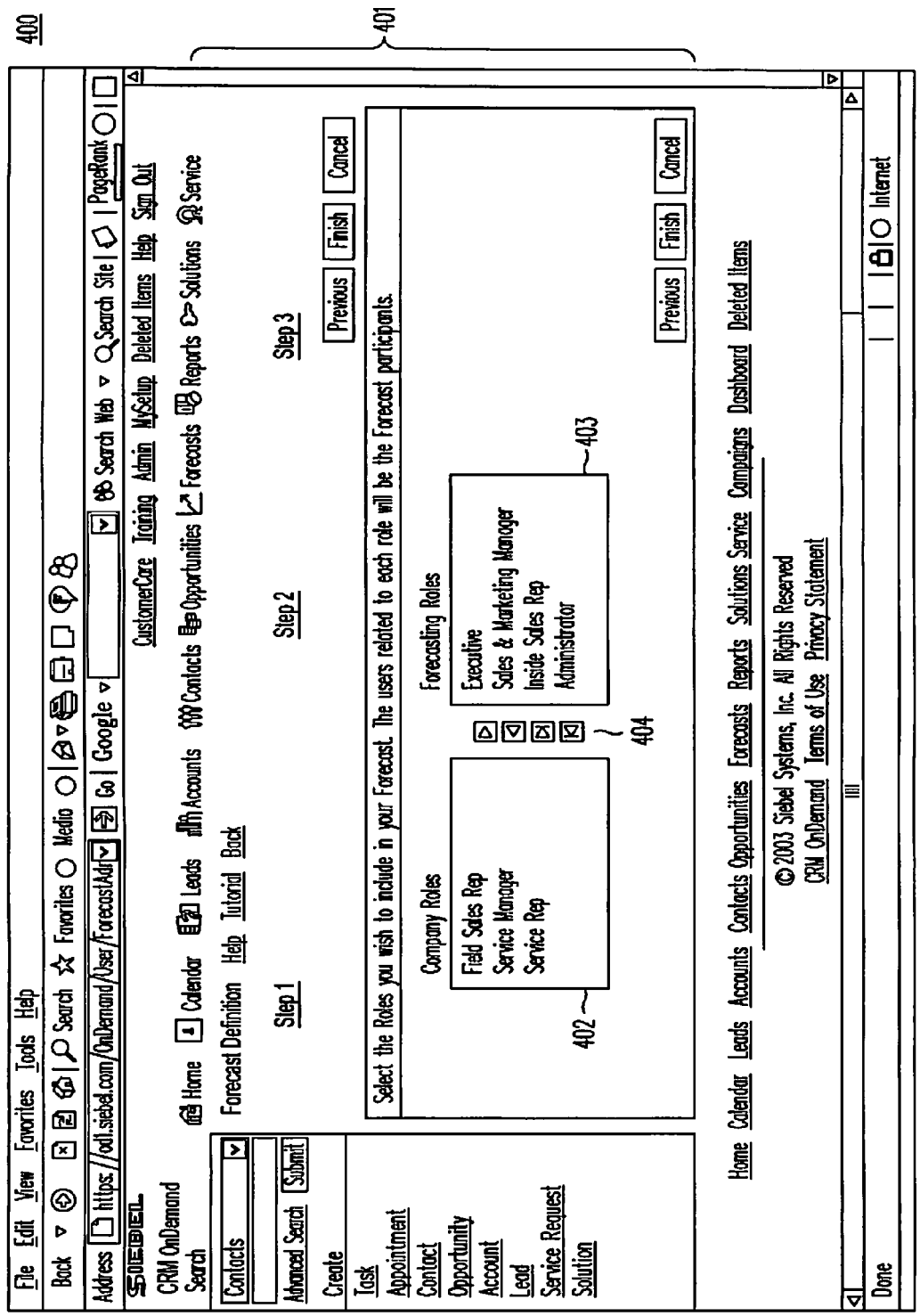
FIG. 4 is a display page illustrating the specifying of the participants of a forecast in one embodiment.

FIGS. 2-4 are display pages illustrating the specifying of a forecast definition in one embodiment. FIG. 2 is a display page illustrating the specifying of a forecast interval in one embodiment. The display page 200 includes a forecast definition area 201. The forecast definition area includes a forecast snapshot interval drop-down list 202 that allows a user to select a frequency of weekly or monthly at which forecast snapshots are to be saved. One skilled in the art will appreciate that a user could specify other frequencies, such as bi-monthly or quarterly. The forecast system may also provide a calendar through which a user can select to generate a forecast on any day and time. FIG. 3 is a display page illustrating the specifying of a forecast day in one embodiment. The display page 300 includes a forecast definition area 301. The forecast definition area includes a forecast snapshot day drop-down list 302. In this example, the drop-down list contains each day of the week. If the forecast snapshot frequency had been selected as monthly, then the drop-down list would contain the numeric days of the month. FIG. 4 is a display page illustrating the specifying of participants of a forecast in one embodiment. The display page 400 includes a forecast definition area 401. The forecast definition area includes a company roles area 402 and a forecasting roles area 403. The company roles area identifies the roles of the participants that may be included within a forecast. Each member of an organization may be assigned a role such as sales representative or sales manager. The forecasting roles area identifies the roles of the members who are to be the participants of the forecast. The buttons 404 are used to select and deselect the roles to be included in the forecast. Alternatively, one forecast system may allow individual members to be selected as participants regardless of their roles.

FIG. 5 is a display page illustrating the individual forecasts of the participants that were saved as part of forecast snapshots in one embodiment. The display page 500 includes a forecast selection area 501. The forecast selection area includes a row for each participant within each forecast snapshot. For example, rows 502 represent the individual forecasts of Sep. 21, 2003 for the five participants, and rows 503 represent the individual forecasts of Oct. 12, 2003 for the five participants. Each row identifies a forecast date, a pipeline amount, a forecast amount, a closed revenue amount, and the owner or participant. A user can select a row to view the details of the opportunities supporting that individual forecast as saved by the forecast snapshot. One skilled in the art will appreciate that other information may be displayed based on the type of forecasting (e.g., product quantity or revenue).

Figure 6:
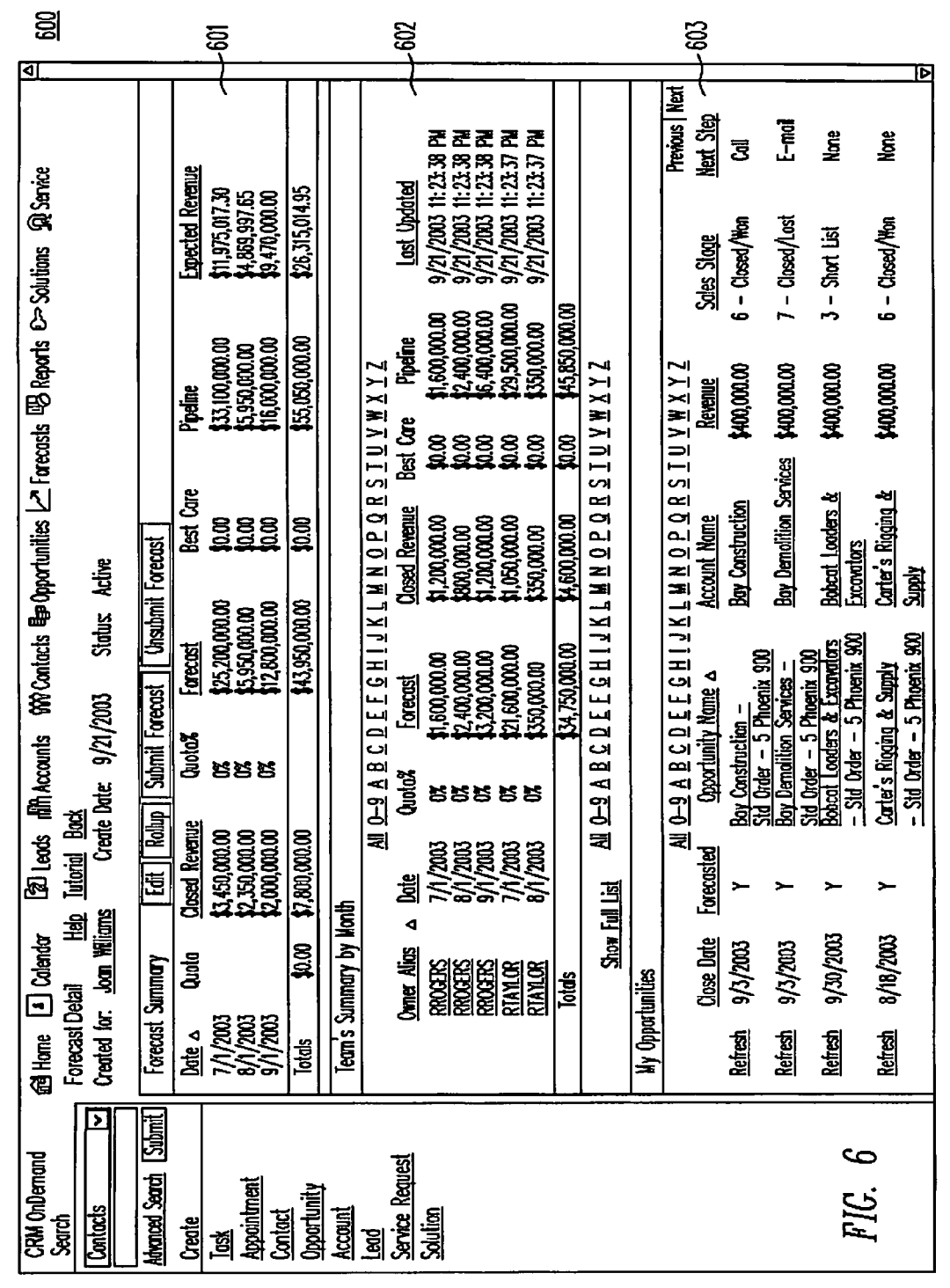

FIG. 6 is a display page illustrating a presentation of forecast information in one embodiment. In this example, a user, Joan Williams, has selected to review the forecast of her team for the quarter ending Sep. 30, 2003. Joan's team includes members Rick Rogers and Ryan Taylor. A team may be defined as a manager and the participants who report to that manager. In this example, Joan Williams may be a manager of the team, and Rick Rogers and Ryan Taylor are reporting participants. One skilled in the art will appreciate that various access mechanisms may be used to restrict access to forecast information. For example, only a team manager may be able to access the detailed information for the reporting participants. The display page 600 includes a summary area 601, a participants area 602, and a user area 603. The summary area includes a row for each forecast snapshot within the quarter. Each row provides summary information for the forecasts of the participants as saved in the forecast snapshot. The summary information includes a date, quota, closed revenue amount, quota percentage, forecast amount, best case amount, pipeline amount, and expected revenue amount. The participants area includes a row for each participant for each forecast snapshot within the quarter. For example, the participants area includes rows for Rick Rogers for the forecast snapshots of July 1, August 1, and September 1. Each row identifies a participant, a date of each forecast snapshot, a quota percentage, a forecast amount, a closed revenue amount, a best case amount, and a pipeline amount. The user area includes a row for each opportunity of the user Joan Williams. Each row includes a close date, a forecasted flag, an opportunity name, an account name, a revenue amount, a sales stage field, and a next step field.

FIG. 7 is a display page illustrating the editing of forecast summary information in one embodiment. The display page 700 includes an edit area 701 through which a user can edit the summary information of a forecast snapshot. The editing of this information effectively overrides the forecast snapshot information initially generated from the individual forecasts of the participants. The forecast system may maintain an audit trail of all edits to the summary information. The forecast system may also allow each participant to edit their individual forecast and opportunity information.

Figure 8:
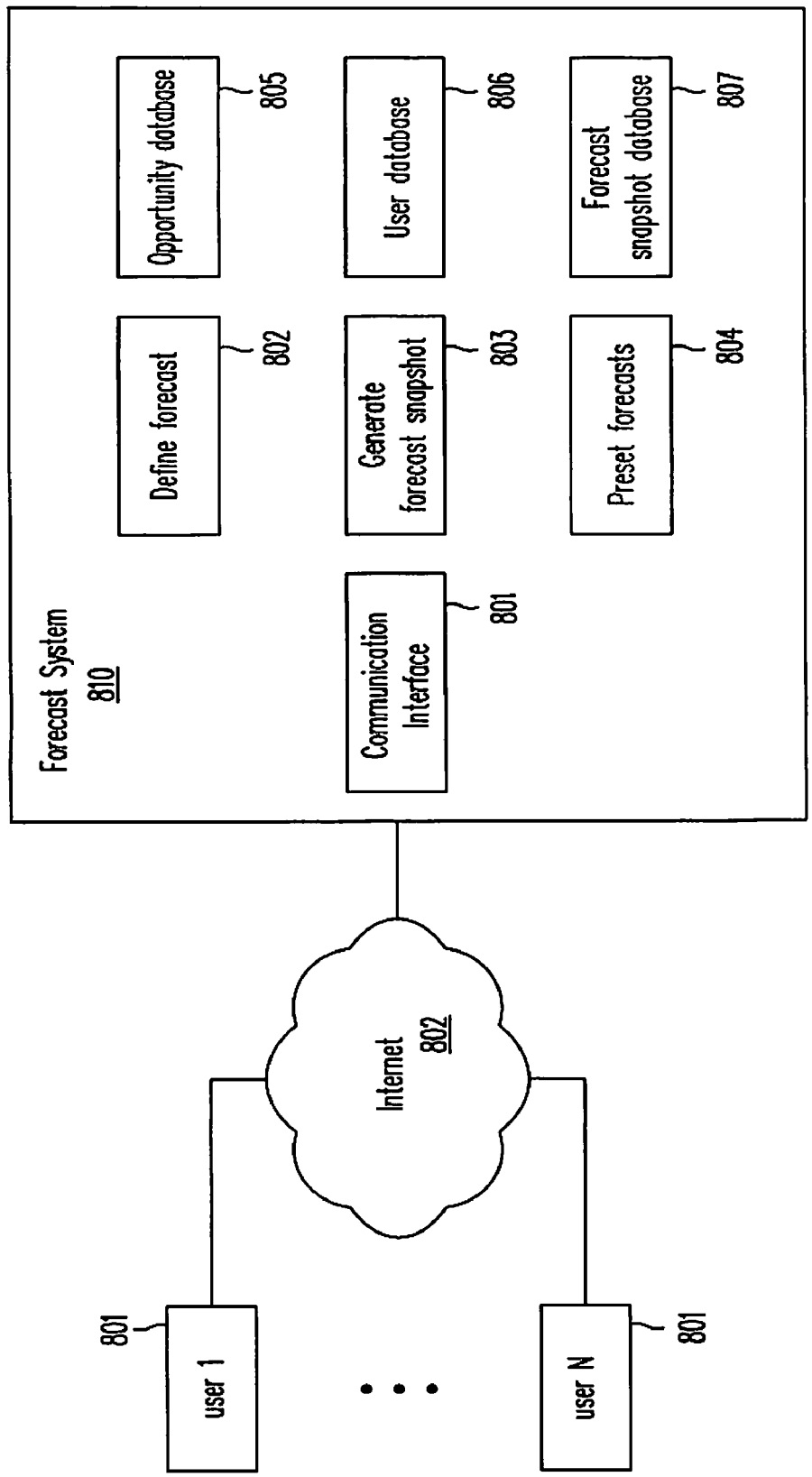
FIG. 8 is a block diagram illustrating components of the forecast system in one embodiment.

FIG. 8 is a block diagram illustrating components of the forecast system in one embodiment. The forecast system 810 is connected to user computer systems 801 via a communications link 802 such as the Internet. In one embodiment, the user computer systems access the forecast system via a conventional web browser. The forecast system also includes an opportunity database 805, a user database 806, and a forecast snapshot database 807. The opportunity database includes an entry for each opportunity of each user. Each entry may include a close date, a forecasted flag, an opportunity name, an account name, a revenue amount, a sales stage field, and a next step field. The close date indicates the date an opportunity was closed or is expected to be closed. The forecasted flag indicates whether an opportunity should be included in forecast amounts. The revenue amount indicates the projected revenue from an opportunity. The sales stage field indicates the current state of an opportunity such as closed and won, closed and lost, and so on. The user database contains an entry for each user. The entries identify a user, a role of the user, the user's manager, and so on. The manager fields of the entries may define the reporting hierarchy within an organization. The forecast snapshot database includes an entry for each forecast snapshot. Each forecast snapshot entry includes summary information and the individual forecasts along with the opportunity data that was used initially to generate that summary information. The summary information can be included at various levels within the reporting hierarchy of an organization. The forecast snapshot database also includes an audit trail of changes that have been made to the forecast snapshots. In one embodiment, the forecast system is implemented on a server that supports multiple organizations, referred to as a multi-tenant environment. In a multi-tenant environment each user is assigned to an organization and each user can only access the information of their organization. The forecast system may include an organization identifier in each table of its database, or it may maintain a separate database for each organization to help restrict access as appropriate.

The forecast system includes a communications interface 801, a define forecast component 802, a generate forecast snapshot component 803, and a present forecasts component 804. The communications interface receives requests from users via the communications link and invokes the appropriate components for processing each request. The invoked component may generate display pages that are provided to the communications interface for sending to the user computer systems. The communications interface in one embodiment implements an HTTP-request and an HTTP-response protocol. The define forecast component controls a user interface that allows users to define a forecast. The define forecast component stores the forecast definitions in the forecast snapshot database. The generate forecast snapshot component is automatically invoked to generate forecast snapshots in accordance with the schedule provided in each forecast definition. The forecast snapshots are generated based on current information found in the opportunity database and the user database. The present forecast component receives requests to present forecast information from a user, retrieves the appropriate forecast information from the forecast snapshot database, and presents the forecast information to the user.

The computer systems and servers (e.g., executing the forecast systems) may include a central processing unit, memory, input devices (e.g., keyboard and pointing devices), output devices (e.g., display devices), and storage devices (e.g., disk drives). The memory and storage devices are computer-readable media that may contain instructions that implement the forecast system. In addition, the data structures and message structures may be stored or transmitted via a data transmission medium such as a signal on a communications link. Various communications links may be used, including the Internet, a local area network, a wide area network, or a point-to-point dial-up connection.

The following tables describe the fields of an opportunity and the summary information of a forecast snapshot in one embodiment in which revenue is forecasted. One skilled in the art will appreciate that many other fields may be included to support forecasting based on product or sub-product revenues or quantities or service revenues. In addition, the fields may support opportunities that are recurring such as a service contract with a set monthly price or a product delivery contract to deliver a certain quantity each month.

| Opportunity Fields | |
|---|---|
| Field | Description |
| Revenue | Anticipated revenue from this opportunity |
| Forecasted Flag | Include this opportunity in the forecasts |
| Probability | Probability of opportunity successfully closing within the quarter |

| Summary Fields | |
|---|---|
| Field | Description |
| Forecasted Revenue | Total revenue of all opportunities that have successfully closed or are scheduled to close in the quarter and that have their forecasted flag set |
| Pipeline | Total revenue of all opportunities |
| Expected Revenue | Forecasted revenue adjusted by the probabilities of the opportunities |
| Best Case | Best case prediction of forecasted revenue (may be input by a manager) |
| Closed Revenue | Total revenue from opportunities that have already successfully closed within the quarter |
| Quota | Revenue quota (may be input by a manger) |

Figure 9:
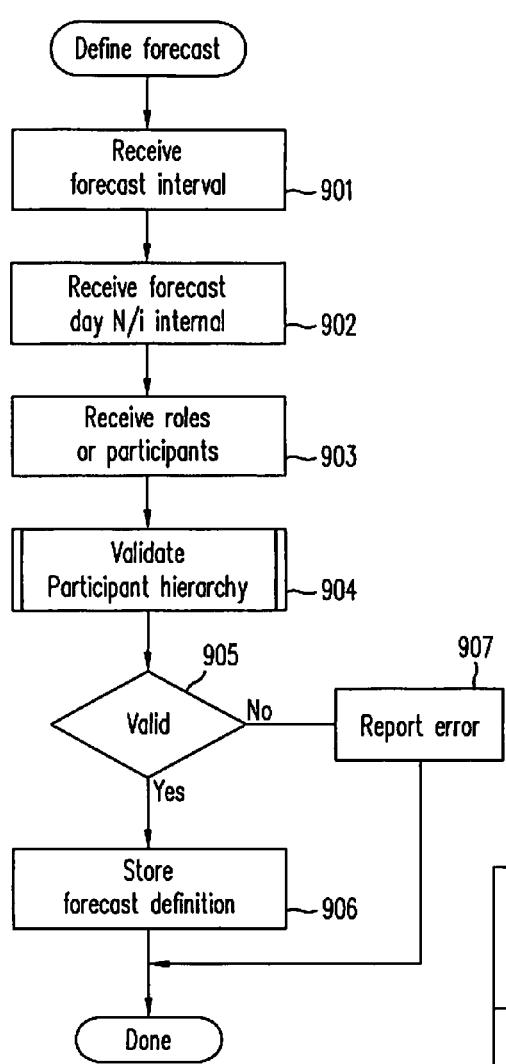
FIG. 9 is a flow diagram illustrating the processing of the define forecast component in one embodiment.

FIG. 9 is a flow diagram illustrating the processing of the define forecast component in one embodiment. This component is invoked when a user makes a request to define a forecast. One skilled in the art will appreciate that one or many forecast definitions can be specified for an organization and for each user. If multiple forecast definitions are defined, then forecast definition names can be assigned for easy identification. For example, forecast definition names can be "Parts Forecast" and "Service Forecast." In block 901, the component receives a forecast interval (e.g., weekly) from a user. In block 902, the component receives a forecast day (e.g., Sunday) within the received interval from the user. In block 903, the component receives the roles of the participants to be included in the forecast. In block 904, the component invokes a validate participant hierarchy component to ensure that a valid reporting hierarchy of the participants has been defined. In decision block 905, if the reporting hierarchy is a valid, then the component continues at block 906, else the component continues at block 907. In block 906, the component stores the forecast definition in the forecast snapshot database and then completes. In block 907, the component reports an error indicating that the reporting hierarchy is not valid and then completes. If the reporting hierarchy is invalid, then the user may need to correct the reporting structure stored in the user database.

Figure 10:
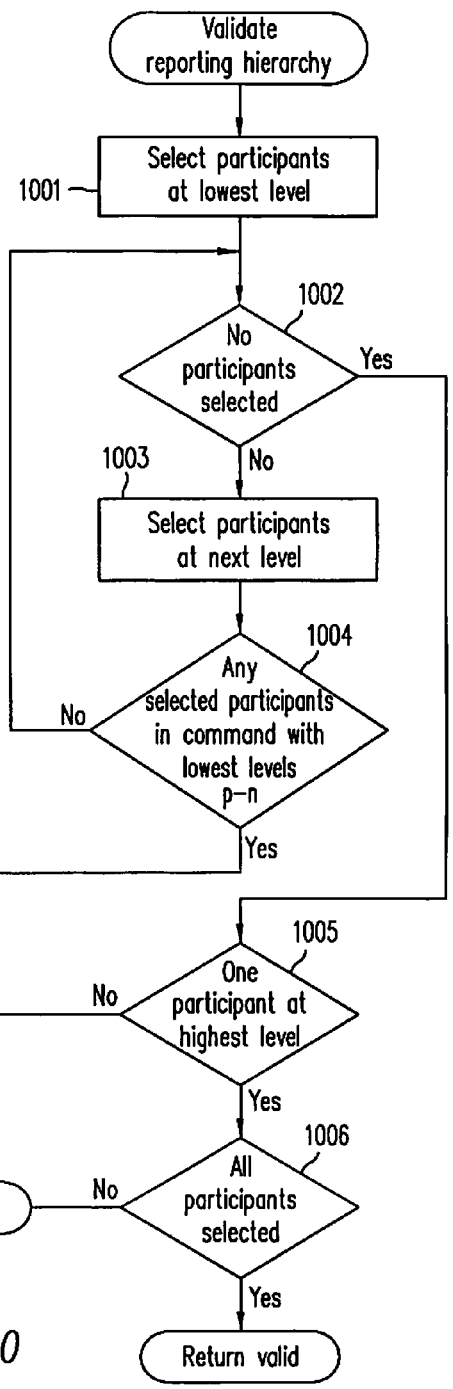
FIG. 10 is a flow diagram illustrating the processing of the validate participant hierarchy component in one embodiment.

FIG. 10 is a flow diagram illustrating the processing of the validate reporting hierarchy component in one embodiment. One skilled in the art will appreciate that many different techniques may be used for validating a reporting hierarchy. In one embodiment, a valid reporting hierarchy is defined as a tree structure of participants with only one participant at the root of the tree. In blocks 1001-1004, the component loops, identifying participants at successively higher levels and determining whether any of the selected participants are also included in a lower level. If so, the reporting hierarchy is invalid because a loop is defined. In block 1001, the component selects the participants at the lowest level. In decision block 1002, if no participants are currently selected, then the component continues at block 1005, else the component continues at block 1003. In block 1003, the component selects the participants at the next highest level. In decision block 1004, if any of the currently selected participants were previously selected for a lower level, then the component returns an indication that the reporting hierarchy is invalid, else the component loops to block 1002. In decision block 1005, if there is only one participant at the highest level, then the component continues at block 1006, else the component returns an indication that the reporting hierarchy is invalid. In decision block 1006, if all the participants have been selected, then all the participants are included in a valid reporting hierarchy and the component returns an indication that the reporting hierarchy is valid, else the component returns an indication that the reporting hierarchy is invalid.

Figure 11:
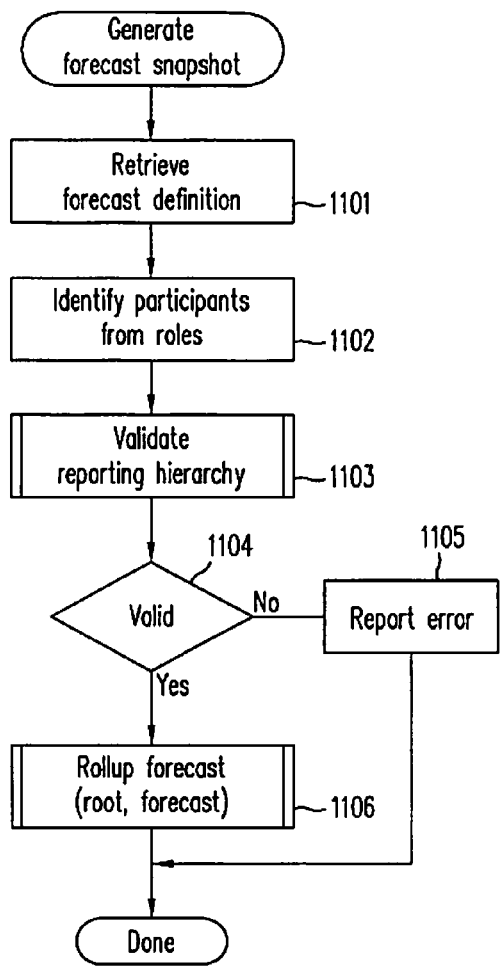
FIG. 11 is a flow diagram illustrating the processing of the generate forecast snapshot component in one embodiment.

FIG. 11 is a flow diagram illustrating the processing of the generate forecast snapshot component in one embodiment. This component is invoked periodically to generate forecast snapshots. The component validates the reporting hierarchy to ensure that it has not become invalid since the forecast was defined. The component then invokes a roll up forecast component to generate the forecast snapshot. The component may be passed the name of a forecast definition when multiple forecast definitions can be defined. In block 1101, the component retrieves the forecast definition from the forecast snapshot database. In block 1102, the component identifies the participants from the user database based on the roles of the retrieved forecast definition. In block 1103, the component invokes the validate reporting hierarchy component. In decision block 1104, if the reporting hierarchy is valid, then the component continues at block 1106, else the component reports that the reporting hierarchy is invalid in block 1105 and completes. In block 1106, the component invokes the roll up forecast component, passing the root participant of the reporting hierarchy and receiving a summary forecast in return. The component then completes. Before completing, the component may send an alert (e.g., sending an electronic mail message or setting a flag on home pages) to each participant so they can update their opportunity or forecast information.

Figure 12:
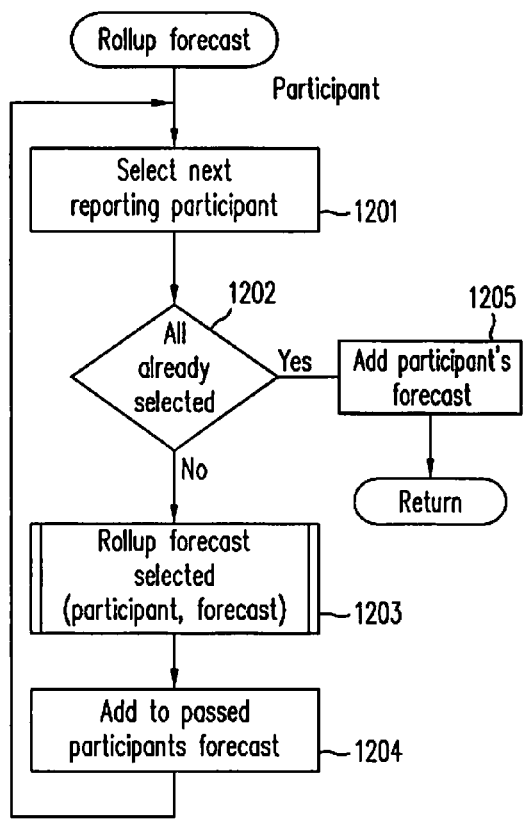
FIG. 12 is a flow diagram illustrating the processing of the roll up forecast component in one embodiment.

FIG. 12 is a flow diagram illustrating the processing of the roll up forecast component in one embodiment. The component is passed an indication of a participant and generates a summary forecast for that participant and any participants reporting to that participant. The component is recursively invoked. In blocks 1201-1204, the component loops, generating the forecast (e.g., summary or individual) for each reporting participant that reports to the passed participant. In block 1201, the component selects the next reporting participant of the passed participant. In decision block 1202, if all the reporting participants have already been selected, then the component continues at block 1205, else the component continues at block 1203. In block 1203, the component recursively invokes the roll up forecast component, passing an indication of the selected participant and receiving a forecast for the selected participant in return. In block 1204, the component adds the forecast of the selected participant to the summary forecast of the passed participant and then loops to block 1201 to select the next reporting participant. In block 1205, the component adds the forecast of the passed participant to the snapshot database, which results in the archiving of the snapshot.

Figure 13:
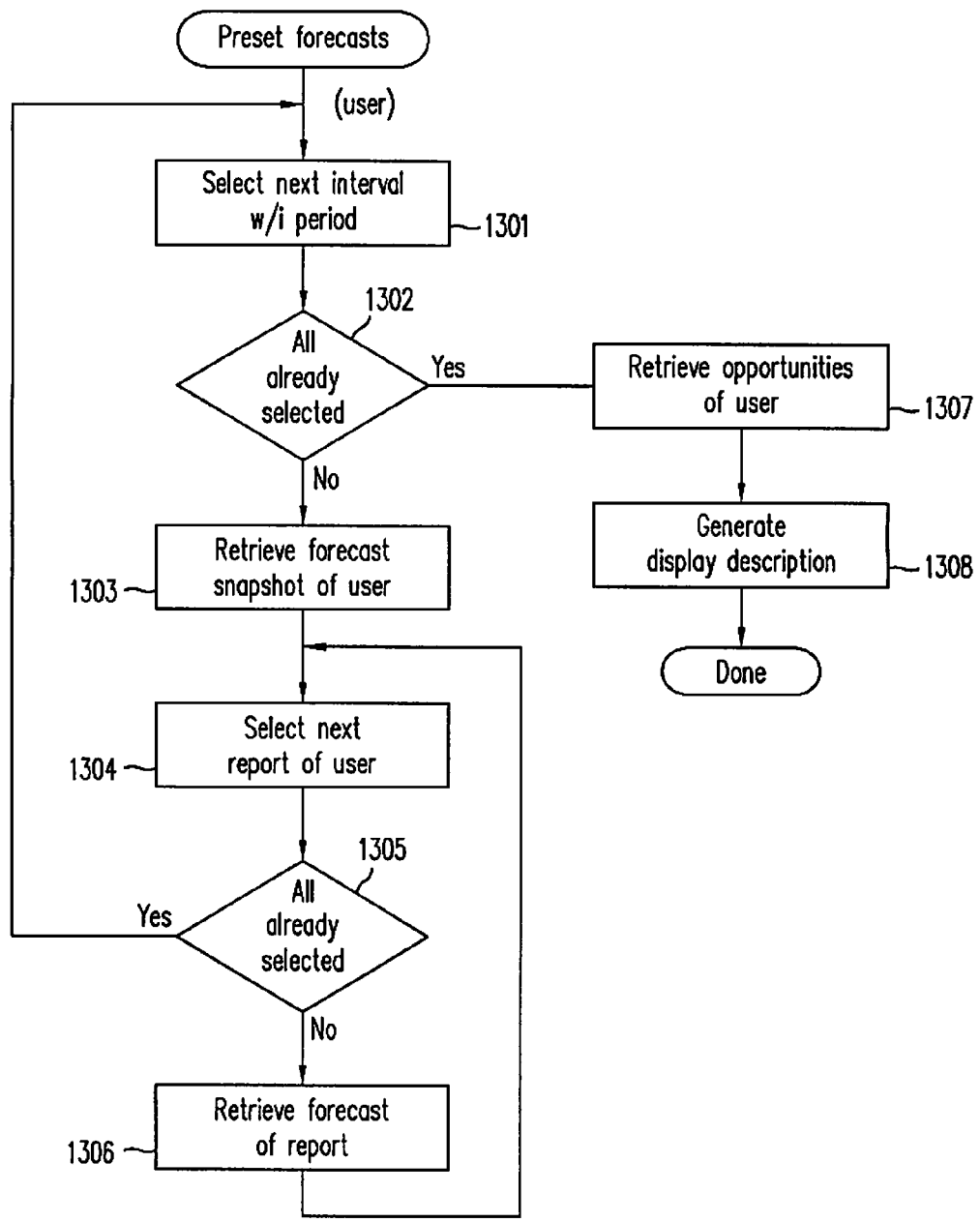
FIG. 13 is a flow diagram illustrating the processing of the present forecast component in one embodiment.

FIG. 13 is a flow diagram illustrating the processing of the present forecasts component in one embodiment. The component is passed the name of the user requesting the forecast information. In blocks 1301-1306, the component loops, retrieving the information from the forecast snapshots. In block 1301, the component selects the next interval within the current forecast period. For example, an interval may be a month when the forecast period is quarterly. The selected interval will have a corresponding forecast snapshot. In decision block 1302, if all the intervals have already been selected, then the component continues at block 1307, else the component continues at block 1303. In block 1303, the component retrieves the summary forecast from the forecast snapshot for the current user. In blocks 1304-1306, the component retrieves the forecasts of the participants who report to the user. In block 1304, the component selects the next reporting participant of the user. In decision block 1305, if all the reporting participants have already been selected, then the component loops to block 1301 to select the next interval within the period, else the component continues at block 1306. In block 1306, the component retrieves the forecast for the selected reporting participant and then loops to block 1304 to select the next reporting participant. In block 1307, the component retrieves the current opportunities of the user. In block 1308, the component generates the display description based on the retrieved information and then completes.

One skilled in the art will appreciate that although specific embodiments of the forecast system have been described herein for purposes of illustration, various modifications may be made without deviating from the spirit and scope of the invention. For example, the forecast system may allow each participant to update their opportunity information and then decide whether the most recent snapshot should be refreshed with the new opportunity information. Whenever a participant updates their forecast or opportunity information in a forecast snapshot, participants higher in the reporting hierarchy may be automatically notified of the update so they can update their forecasts as appropriate. Accordingly, the invention is not limited except by the appended claims.

We claim:

1. A method in a computer system, comprising:
    defining a forecast snapshot, wherein
        the defining comprises:
            receiving an interval, wherein
                the interval specifies a frequency at which forecast snapshots are generated,
            receiving a specified day within the interval, wherein the forecast snapshot is generated on the specified day, and
            receiving specified roles of participants in a reporting hierarchy of the participants, wherein
                the forecast snapshot comprises information regarding a member of an organization, and
                the information indicates the member is assigned one of the specified roles in the reporting hierarchy;
    causing a processor of the computer system to determine if a valid reporting hierarchy has been defined;
    causing the processor to generate an indication of validity, in response to a determination that the valid reporting hierarchy has been defined;
    in response to the indication of validity, causing the processor to automatically generate
        the forecast snapshot, wherein
            the forecast snapshot is based on opportunity information of the participants, and
            the forecast snapshot comprises the opportunity information; and
    causing the processor to automatically send an alert notifying the participants of the generation of the forecast snapshot.

2. The method of claim 1, wherein a participant of the participants updates the forecast snapshot in response to the alert.

3. The method of claim, 1 wherein
the reporting hierarchy comprises more than one level, and
the validating comprises:
 detecting whether a participant of the participants is included at more than one level of the reporting hierarchy, and
 detecting whether there exists only one root in the reporting hierarchy.

4. The method of claim 3, further comprising:
if the reporting hierarchy is invalid:
 notifying a user, and
 correcting the reporting hierarchy.

5. The method of claim 1, wherein the generating further comprises:
 for each participant of the participants, retrieving opportunity information; and
 generating a forecast summary in accordance with the reporting hierarchy, wherein
  the forecast summary is based on the opportunity information retrieved for the each participant of the participants.

6. The method of claim 5, wherein the forecast snapshot further comprises:
 the forecast summary, wherein
  the forecast summary comprises one or more data fields based on processing of the opportunity information, and
  the processing of the opportunity information comprises:
   generating a forecasted revenue by summing revenue of at least one opportunity, and
   generating an expected revenue based on an adjustment of the forecasted revenue by probabilities of an opportunity;
 a best case based on a prediction of the forecasted revenue; and
 an audit trail of edits to the forecast summary.

7. The method of claim 1, wherein the forecast snapshot is associated with a forecast period.

8. The method of claim 7, further comprising: receiving an indication of the forecast period.

9. The method of claim 1, wherein the forecast snapshot is automatically generated based on the specified day and the interval.

10. A computer system comprising a processor and a memory, wherein the memory stores program instructions executable by the processor to:
 define a forecast snapshot, wherein
  the definition of the forecast snapshot comprises:
   receiving a schedule, wherein
    the schedule specifies a frequency at which forecast snapshots are created, and
   receiving an indication of participants, wherein the forecast snapshot comprises information regarding the participants;
 cause the processor to determine if a valid reporting hierarchy of the participants has been defined;
 cause the processor to generate an indication of validity, in response to a determination that the valid reporting hierarchy of the participants has been defined;
 in response to the indication of validity, automatically generate the forecast snapshot, wherein
  the forecast snapshot is based on opportunity information of the participants, and
  the forecast snapshot comprises the opportunity information; and
 automatically send an alert to the participants indicating the forecast snapshot has been created.

11. The computer system of claim 10, wherein
the schedule is based on a user-defined interval, and
a participant of the participants updates forecast information in response to the alert.

12. The computer system of claim 10, wherein the computer system is further configured to
 perform validation during the defining of the forecast snapshot.

13. The computer system of claim 12, further comprising:
a notification component configured to notify a user, if the reporting hierarchy is invalid; and
a correction component configured to facilitate correcting the reporting hierarchy, if the reporting hierarchy is invalid.

14. The computer system of claim 10 wherein the computer system is further configured to:
 for each participant of the participants, retrieve opportunity information; and
 generate a forecast summary in accordance with the reporting hierarchy, wherein
  the forecast summary is based on the opportunity information retrieved for the each participant of the participants.

15. The computer system of claim 14, wherein the forecast snapshot further comprises:
 the forecast summary, wherein
  the forecast summary comprises one or more data fields based on processing of the opportunity information, and
  the processing of the opportunity information comprises:
   generating a forecasted revenue by summing revenue of at least one opportunity, and
   generating an expected revenue based on an adjustment of the forecasted revenue by probabilities of an opportunity;
 a best case based on a prediction of the forecasted revenue; and
 an audit trail of edits to the forecast summary.

16. The computer system of claim 10, wherein participants are indicated by their roles.

17. A computer-readable storage medium comprising instructions executable to implement a method, the method comprising:
 receiving a schedule for generating forecast snapshots;
 receiving an indication of participants to be included in the forecast snapshots;
 determining if a valid reporting hierarchy of the participants has been defined;
 generating an indication of validity, in response to a determination that the valid reporting hierarchy of the participants has been defined;
 in response to the indication of validity, automatically generating a forecast snapshot based on opportunity information of the participants, wherein
  the forecast snapshot comprises the opportunity information, and
  the forecast snapshot is generated in accordance with the schedule; and
 automatically sending an alert notifying the participants of the generation of the forecast snapshot.

18. The computer-readable storage medium of claim 17, wherein the schedule is based on an interval.

19. The computer-readable storage medium of claim 18, wherein the schedule specifies a day within the interval.

20. The computer-readable storage medium of claim 17, wherein the participants are indicated by their roles within an organization.

21. The computer-readable storage medium of claim 17, wherein
the reporting hierarchy comprises more than one level, and the validating comprises:
- detecting whether a participant of the participants is included at more than one level of the reporting hierarchy, and
- detecting whether there exists only one root in the reporting hierarchy.

22. The computer-readable storage medium of claim 21, further comprising:
- notifying a user, if the reporting hierarchy is invalid; and
- correcting the reporting hierarchy, if the reporting hierarchy is invalid.

23. The computer-readable storage medium of claim 17, wherein the automatically generating the forecast snapshot comprises:
- for each participant of the participants, retrieving opportunity information, and
- generating a forecast summary in accordance with the reporting hierarchy, wherein
  - the forecast summary is based on the opportunity information retrieved for the each participant of the participants.

24. The computer-readable storage medium of claim 23, wherein the forecast snapshot further comprises:
the forecast summary, wherein
  the forecast summary comprises one or more data fields based on processing of the opportunity information, and
  the processing of the opportunity information comprises:
  - generating a forecasted revenue by summing revenue of at least one opportunity, and
  - generating an expected revenue based on an adjustment of the forecasted revenue by probabilities of an opportunity;
a best case based on a prediction of the forecasted revenue; and
an audit trail of edits to the forecast summary.

* * * * *

UNITED STATES PATENT AND TRADEMARK OFFICE
CERTIFICATE OF CORRECTION

| | | |
|---|---|---|
| PATENT NO. | : 8,065,178 B2 | Page 1 of 1 |
| APPLICATION NO. | : 10/731418 | |
| DATED | : November 22, 2011 | |
| INVENTOR(S) | : Lloyd et al. | |

It is certified that error appears in the above-identified patent and that said Letters Patent is hereby corrected as shown below:

In column 9, line 10, in Claim 4, delete "invalid:" and insert -- invalid, --, therefor.

Signed and Sealed this
Twenty-fourth Day of January, 2012

David J. Kappos
*Director of the United States Patent and Trademark Office*